Figure 4:
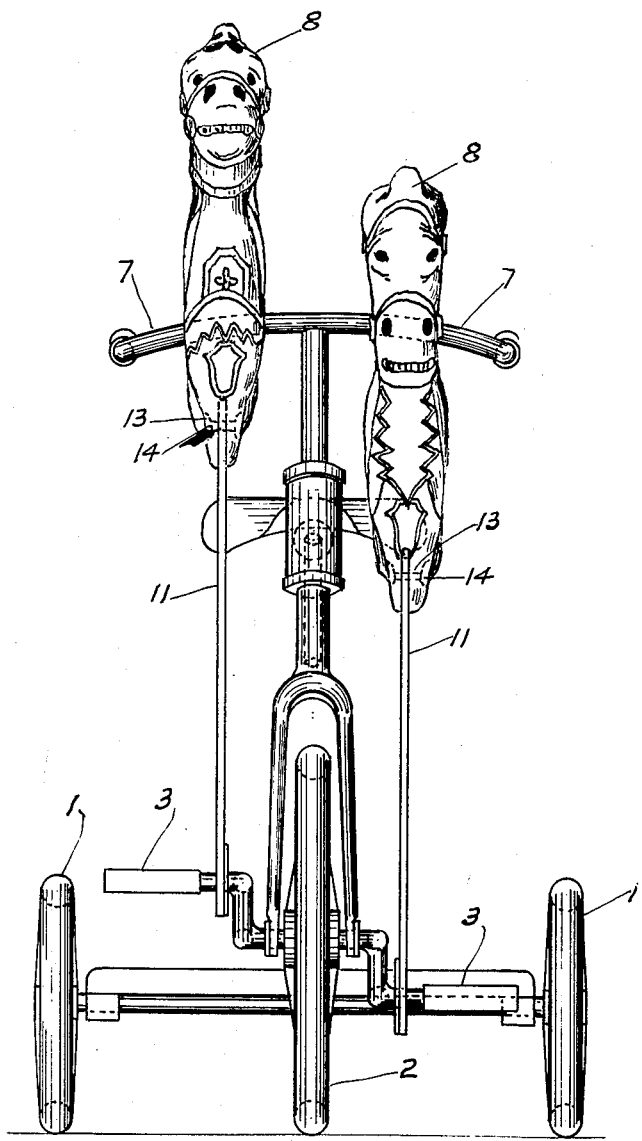

Dec. 30, 1958   W. F. WEST, JR   2,866,649
TRICYCLE WITH ATTACHED PIVOTED HORSE HEADS
Filed March 27, 1956   2 Sheets-Sheet 1
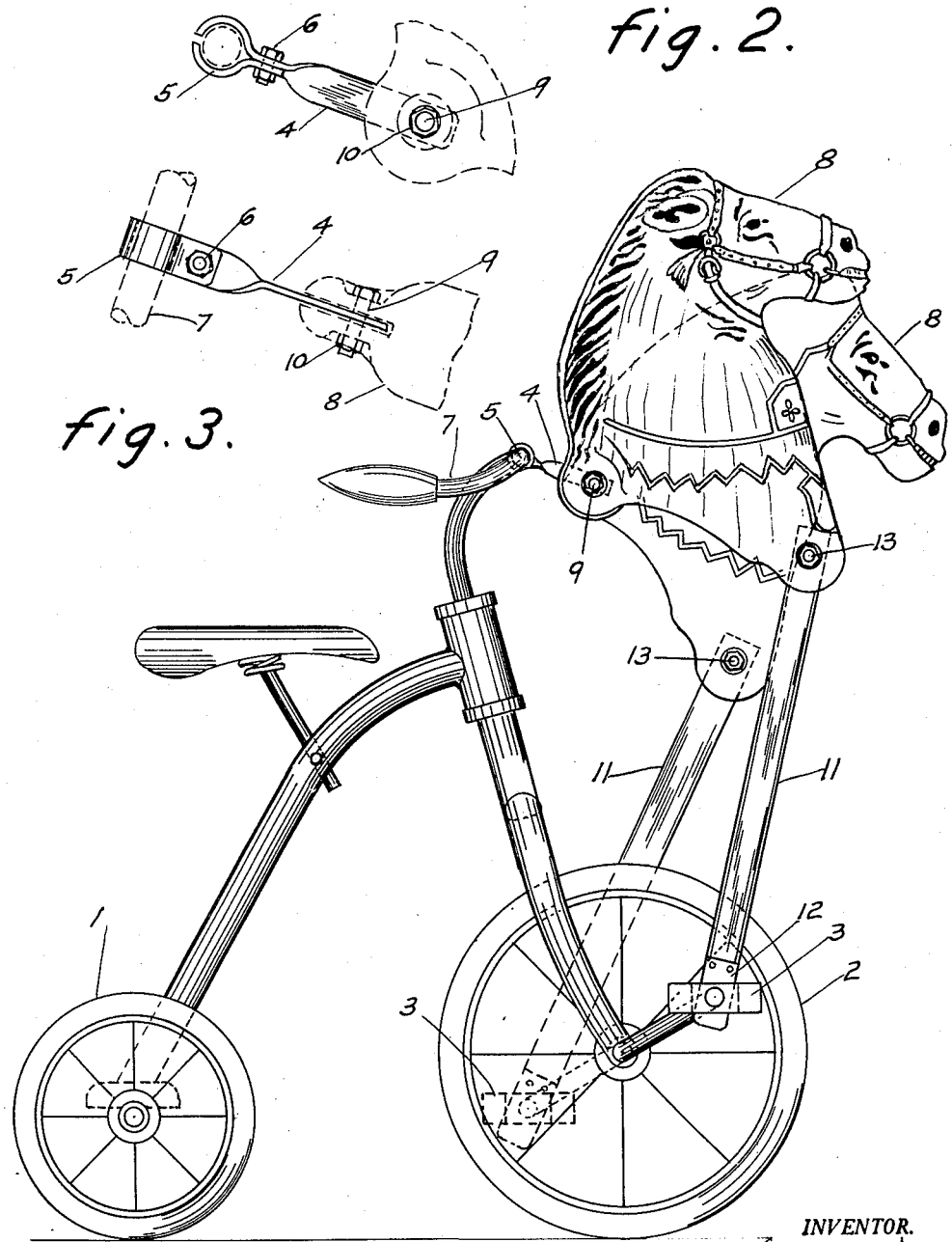
INVENTOR.
William Franklin West, Jr.
BY Chas. Denegre
Attorney Dec. 30, 1958  W. F. WEST, JR  2,866,649
TRICYCLE WITH ATTACHED PIVOTED HORSE HEADS
Filed March 27, 1956  2 Sheets-Sheet 2

INVENTOR.
William Franklin West, Jr.
BY Chas. Denegre
Attorney.

United States Patent Office 2,866,649
Patented Dec. 30, 1958

2,866,649

TRICYCLE WITH ATTACHED PIVOTED HORSE HEADS

William Franklin West, Jr., Gadsden, Ala.

Application March 27, 1956, Serial No. 574,292

1 Claim. (Cl. 280—1.202)

This invention relates to a tricycle with horse heads attached as a toy. It has for its main objects to provide such a combination that will be highly satisfactory as an amusement device for children, comparatively cheap to manufacture, simple in structure, easy to use and keep in working condition, attractive in appearance, and very durable.

A further object is to provide a toy structure that will be easy to dismantle if it is desired to use the tricycle separately.

Other objects and advantages will appear from the drawings herewith and description.

By referring generally to the drawings it will be observed that Fig. 1 is a side elevational view of a tricycle with horse heads attached according to the present invention; Fig. 2 is a detail view of one of the arms or bars used for attaching one horse head to the handle bar of the tricycle; Fig. 3 is another view of the part shown in Fig. 2; Fig. 4 is a front elevational view of the tricycle and horse heads shown in Fig. 1.

Similar reference numerals refer to similar parts throughout the several views.

Referring to the drawings in detail it will be seen that the combination comprises a tricycle having two rear wheels 1 and a front wheel 2 provided with pedals 3 for driving the front wheel by foot pressure of a rider (not shown). Two supporting bars 4 are removably attached in line with each other by clamps 5 and bolts 6 to the handle bar 7 and are held in fixed condition. The horse heads 8 are pivotally attached at their upper neck portions to the supporting bars by small bolts 9 and nuts 10. The operating bars 11 are pivotally attached to the pedals as at 12 by their lower ends with their upper ends pivotally attached by small bolts 13 and nuts 14 to the lower neck portions of the horse heads.

From the foregoing it will appear that when the tricycle is moved forward or backward the horse heads will also move upward and downward to the limit of movement allowed by the revolving pedals and the pivoted connections at the upper neck portions of the horse heads.

The various parts of the structure may be made of any material suitable for the purpose; also the parts may be made in different sizes and capacities to suit children of different ages and sizes.

While I have shown and described the preferred embodiment of my invention, I do not wish to limit same to the exact and precise details of structure, and reserve the right to make all modifications and changes so long as they remain within the scope of the invention and the following claim.

Having described my invention I claim:

A toy comprising, a tricycle having a handle bar, two rear wheels and one front wheel, said front wheel being mounted on a shaft in fixed condition, two foot pedals on cranks attached on the ends of said shaft, two similar bars attached by an end of each to the handle bar of the tricycle in fixed condition and extending forward in the same relative position from the front of the handle bar; two imitation horse heads with necks, each of said bars having an upper rear portion of a neck of a horse head pivotally connected to its outer end by bolts and nuts, two additional comparatively long similar bars connected by an end of each to said pedal cranks, the other ends of these bars being connected pivotally by bolts and nuts to the lower front neck portions of the horse heads, said connections being adapted to cause said horse heads to move upward and downward when said tricycle is moved forwardly.

References Cited in the file of this patent

UNITED STATES PATENTS

| | | |
|---|---|---|
| 632,809 | Dunn | Sept. 12, 1899 |
| 1,386,736 | Schwarz | Aug. 9, 1921 |
| 1,414,950 | Hoge | May 2, 1922 |
| 1,859,617 | Carlstrom | May 24, 1932 |
| 2,578,682 | Fernstrom | Dec. 18, 1951 |